(12) United States Patent
Yang et al.

(10) Patent No.: US 10,237,782 B2
(45) Date of Patent: Mar. 19, 2019

(54) HARDWARE ACCELERATION FOR BATCHED SPARSE CODES

(71) Applicant: The Chinese University of Hong Kong, Shatin (CN)

(72) Inventors: Shenghao Yang, Mo On Shan (CN); Wai-ho Yeung, Hong Kong (CN); Tak-Ion Chao, Hong Kong (CN); Kin-Hong Lee, Tai Po (CN); Chi-Iam Ho, Hong Kong (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 251 days.

(21) Appl. No.: 15/395,981

(22) Filed: Dec. 30, 2016

(65) Prior Publication Data

US 2017/0195914 A1    Jul. 6, 2017

Related U.S. Application Data

(60) Provisional application No. 62/273,056, filed on Dec. 30, 2015.

(51) Int. Cl.
*H04W 28/06* (2009.01)
*H04L 1/00* (2006.01)

(52) U.S. Cl.
CPC ........... *H04W 28/06* (2013.01); *H04L 1/0043* (2013.01); *H04L 1/0052* (2013.01); *H04L 1/0076* (2013.01)

(58) Field of Classification Search
None
See application file for complete search history.

(56) References Cited

U.S. PATENT DOCUMENTS

| 6,430,681 B1 * | 8/2002 | Nagao ................. G06F 9/30094 708/490 |
| 8,693,501 B2 | 4/2014 | Yang et al. |
| 2001/0032226 A1 * | 10/2001 | Takano .................. H03H 17/02 708/300 |

FOREIGN PATENT DOCUMENTS

CN             103250463 A        8/2013

OTHER PUBLICATIONS

Huang et al., "Just FUN: A Joint Fountain Coding and Network Coding Approach to Loss-Tolerant Information Spreading," *In Proceedings of the 15th ACM international symposium on Mobile ad hoc networking and computing*, pp. 83-92. ACM, 2014.

(Continued)

*Primary Examiner* — Kashif Siddiqui
*Assistant Examiner* — Mehedi S Aley
(74) *Attorney, Agent, or Firm* — Kilpatrick Townsend & Stockton LLP

(57) ABSTRACT

Hardware acceleration for batched sparse (BATS) codes is enabled. Hardware implementation of some timing-critical procedures can effectively offload computationally intensive overheads, for example, finite field arithmetic, Gaussian elimination, and belief propagation (BP) calculations, and this can be done without direct mapping of software codes to a hardware implementation. Suitable acceleration hardware may include pipelined multipliers configured to multiply input data with coefficients of a matrix associated with a random linear network code in a pipelined manner, addition components configured to add multiplier output to feedback data, and switches to direct data flows to and from memory components such that valid result data is not overwritten and such that feedback data corresponds to most recent valid result data. Acceleration hardware components (e.g., number and configuration) may be dynamically (Continued)

adjusted to modify BATS code parameters and adapt to changing network conditions.

20 Claims, 10 Drawing Sheets

(56) References Cited

OTHER PUBLICATIONS

Ng et al., "Finite-Length Analysis of BATS Codes," *In Network Coding (NetCod)*, 2013 International Symposium on, pp. 1-6. IEEE, 2013.

Xu, et al., "Two-Phase Cooperative Broadcasting Based on Batched Network Code," *IEEE Transactions on Communications*, vol. 64, No. 2, Feb. 2016, 706-714.

Xu et al., "Reliable Broadcast to a User Group with Limited Source Transmisions," *In Communications (ICC)*, 2015 IEEE International Conference on, pp. 2048-2053. IEEE, 2015.

Yang et al. "Coding for a Network Coded Fountain," In *Information Theory Proceedings (ISIT), 2011 IEEE International Symposium on*, pp. 2647-2651. IEEE, 2011.

Yang, et al., "Further Results on Finite-Length Analysis of BATS Codes," *Globecom Workshops (GC Wkshps)* 2016 IEEE, pp. 1-6, 2016.

Yang et al., "Batched Sparse Codes," *IEEE Transactions on Information Theory* 60, No. 9 (2014): 5322-5346.

Yang et al., "BATS: Network Coding in Action," *In Communication, Control, and Computing* (Allerton), 2014 52nd Annual Allerton Conference on, pp. 1204-1211. IEEE, 2014.

Yang et al., "Tree Analysis of BATS Codes," *IEEE Communications Letters* 20, No. 1 (2016): 37-40.

Zhang et al., "FUN Coding: Design and Analysis," *IEEE/ACM Transactions on Networking* 24, No. 6 (2016): 3340-3353.

\* cited by examiner

HARDWARE ACCELERATION FOR BATCHED SPARSE CODES

FIELD OF THE INVENTION

This invention pertains generally to device-facilitated communication and, more particularly, to device-facilitated communication protocols utilizing random linear network coding.

BACKGROUND

A batched sparse (BATS) code is a relatively low complexity random linear network coding (RLNC) scheme that can achieve asymptotic bandwidth optimality for many types of communication networks with packet loss. However, there are several unresolved implementation issues. For example, although the BATS code is relatively low complexity, its complexity is still sufficient to cause practical implementation problems with respect to particular hardware designs and/or components. Problems include:
1) Computational costs of encoding and decoding at source and sink nodes, respectively;
2) Storage and computational cost of network coding at intermediate nodes; and
3) The overhead of coefficient vector computation.

Embodiments of the invention are directed toward solving these and other problems individually and collectively.

BRIEF SUMMARY

Hardware acceleration for batched sparse (BATS) codes is enabled. Hardware implementation of some timing-critical procedures can effectively offload computationally intensive overheads, for example, finite field arithmetic, Gaussian elimination, and belief propagation (BP) calculations, and this can be done without direct mapping of software codes to a hardware implementation. Suitable acceleration hardware may include pipelined multipliers configured to multiply input data with coefficients of a matrix associated with a random linear network code in a pipelined manner, addition components configured to add multiplier output to feedback data, and switches to direct data flows to and from memory components such that valid result data is not overwritten and such that feedback data corresponds to most recent valid result data. Acceleration hardware components (e.g., number and configuration) may be dynamically adjusted to modify BATS code parameters and adapt to changing network conditions.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, hardware acceleration for BATS codes (and other suitable random linear network codes) is provided. For example, such hardware-level acceleration may be incorporated in communication devices such as wireless communication devices including wireless routers. In accordance with at least one embodiment of the invention, practical implementation issues are addressed at least in part by configuring the application of network coding to relatively small subsets or batches of input packets. Different numbers and/or subsets of input packets may be encoded, for example, to adapt to transmission environment characteristics, and in accordance with at least one embodiment of the invention, hardware designs may be reconfigurable to that end.

In accordance with at least one embodiment of the invention, to optimize the number of packets to be processed, hardware implementation of some timing-critical procedures can effectively offload computationally intensive overheads. In accordance with at least one embodiment of the invention, this can be done without direct mapping of software codes to a hardware implementation. In accordance with at least one embodiment of the invention, several hardware accelerator components are identified as throughput-critical such as one or more components implementing finite field arithmetic, one or more components implementing a Gaussian elimination operation, one or more components implementing belief propagation (BP) calculations, and one or more components implementing control logic.

Figure 1:
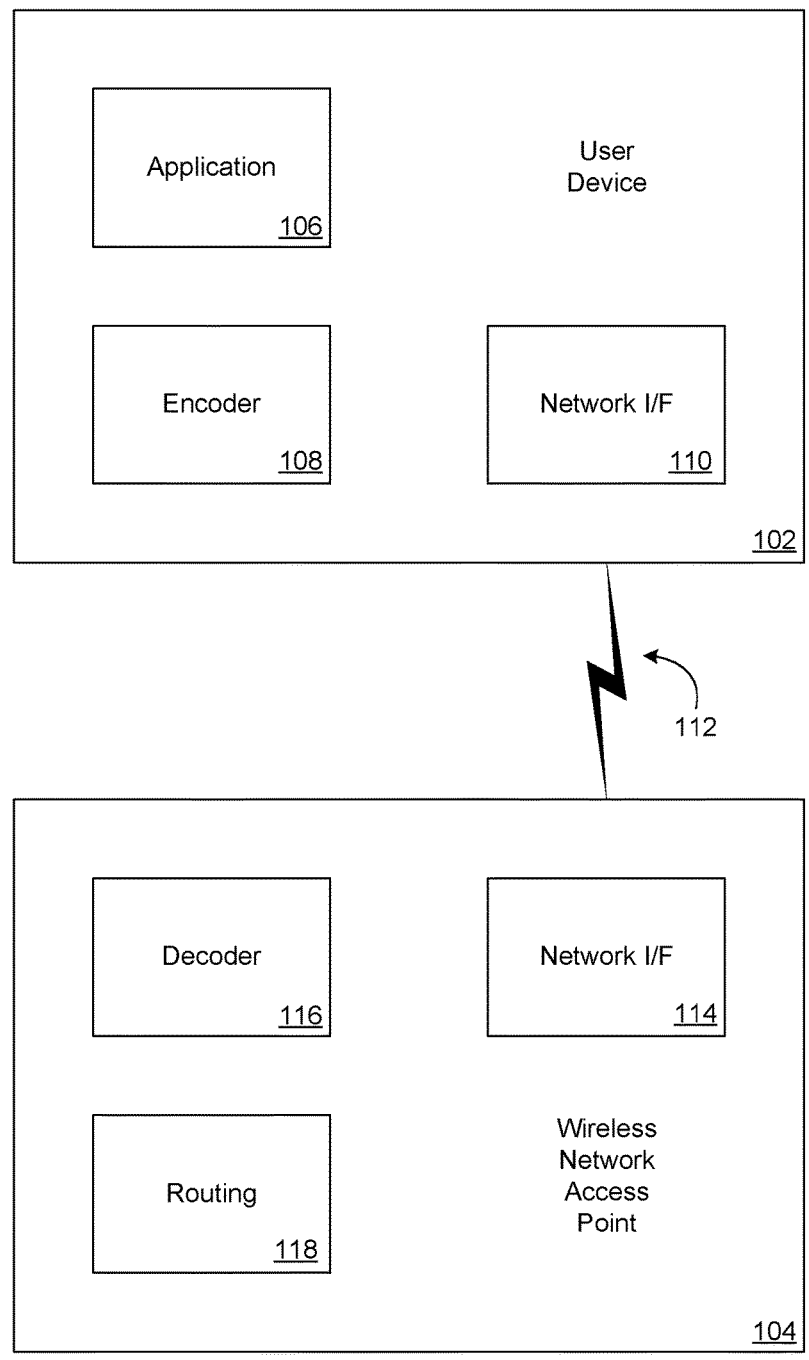
FIG. 1 is a schematic diagram depicting aspects of an example communication environment in accordance with at least one embodiment of the invention.

FIG. 1 depicts aspects of an example system architecture 100 in accordance with at least one embodiment of the invention. The example system architecture includes a user device 102 communicating with a wireless network access point 104. The user device and wireless network access point of FIG. 1 are examples of source nodes (sometimes called senders) and sink nodes (sometimes called receivers). A device may be both a source node and a sink node (sometimes called relay nodes or relays). The user device and/or the wireless network access point may be any suitable device capable of participating in message coding and/or decoding as described herein including a device incorporating one or more circuits such as electronic circuits, optical circuits, analog circuits, digital circuits, integrated circuits ("ICs", sometimes called "chips") including application-specific ICs ("ASICs") and field-programmable gate arrays ("FPGAs"), and suitable combinations thereof, a computing device (e.g., incorporating one or more computer processors and/or CPUs) and/or a computer system (e.g., incorporating one or more computing devices). The user device includes an application module and/or component (collectively "component") 106 implementing a communication application such as audio communication, video communication, text-based communication, digital media communication including streams of digital media and suitable combinations thereof. The application component 106 may generate messages for communication. An encoder 108 may encode the messages for transmission as encoded packets in accordance with at least one embodiment of the invention, and a network interface 110 may transmit 112 the encoded packets to a corresponding network interface 114 at the wireless network access point 104. The network interface of the wireless network access point may forward the received packets to a decoder 116 (e.g., a decoding component of the wireless network access point). In accordance with at least one embodiment of the invention, the decoder may efficiently decode the encoded packets received from the user device, and forward the decoded packets and/or the corresponding messages generated by the application of the user device to a routing component 118 for routing to one or more destinations of the messages. Alternatively, or in addition, the wireless network access point may correspond to another user device and the decoder may provide the decoded messages to an application for presentation to a user.

In accordance with at least one embodiment of the invention, a packet accumulator may be configured to improve encoding, recoding and decoding throughputs of a BATS coding system relative to naïve implementations. The packet accumulator may utilize techniques including:

a. Optimizing (e.g., minimizing) the clock cycle, hence optimizing (e.g., maximizing) throughput;

b. Avoiding repetitive transfer of data between conventional router hardware and accelerator hardware;

c. Optimizing (e.g., minimizing) control requirements by the router, hence its software complexity.

Figure 2:
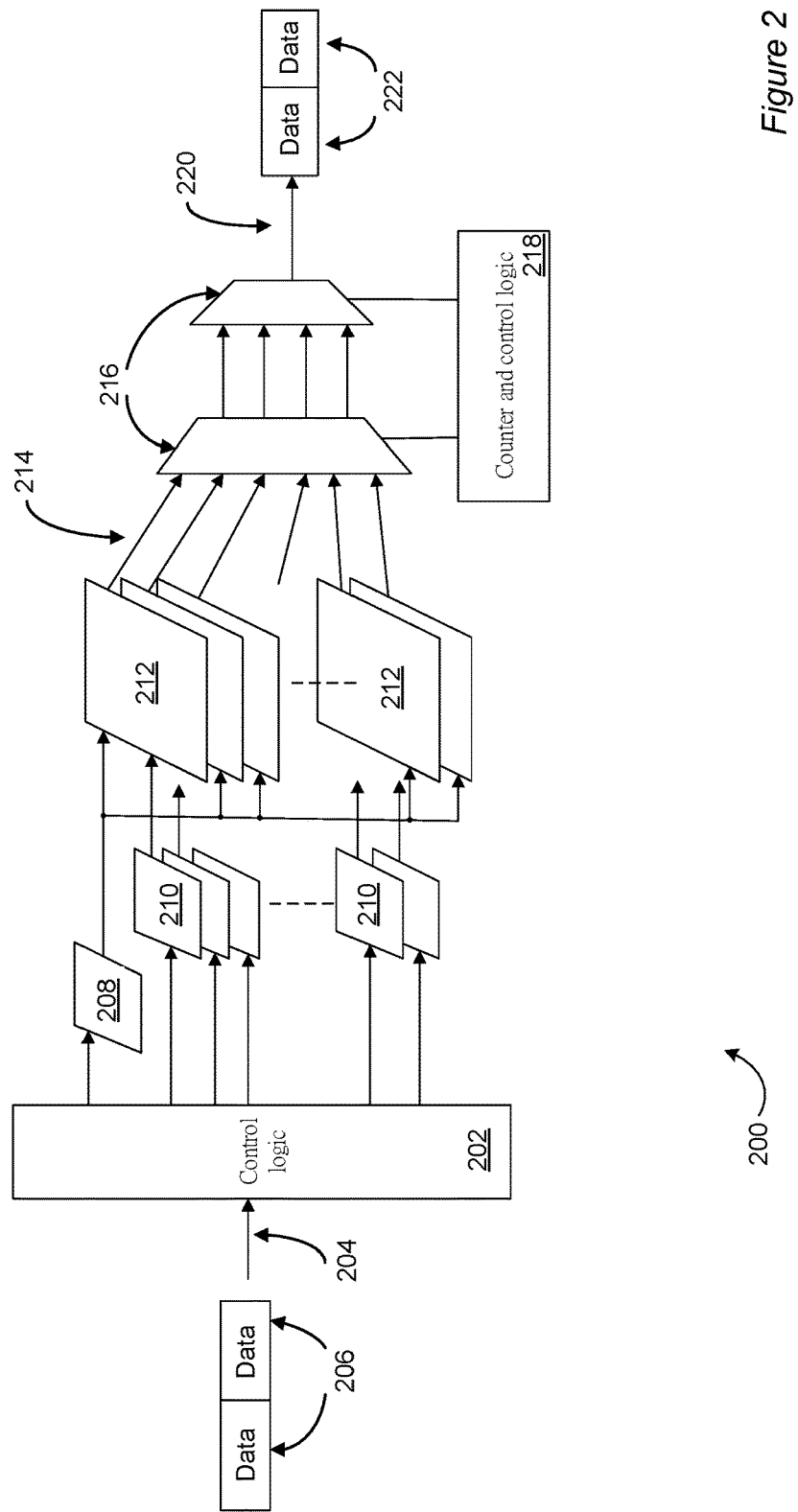
FIG. 2 is a schematic diagram depicting aspects of an example system architecture in accordance with at least one embodiment of the invention.

FIG. 2 depicts an example hardware implementation 200 utilizing one or more FPGAs in accordance with at least one embodiment of the invention. In FIG. 2, control logic 202 transforms N bytes of input 204 (e.g., data packets 206 of a batch of M data packets) into a payload buffer 208 of size N bytes and signals to M coefficient buffers 210 (e.g., storing coefficients of a matrix associated with a BATS code such as a transfer matrix). The particular format of the input 204 and/or the data packets 206 may depend on the application. In accordance with at least one embodiment of the invention, the control logic may at least partially generate the coefficient buffers. In accordance with at least one embodiment of the invention, the coefficient buffers may be generated based at least in part on one or more hardware random number generators. The payload buffer 208 and a corresponding coefficient buffer 210 may be provided to one of M pipelined accumulators 212 (described below in more detail with reference to FIG. 3). The set of M pipelined accumulators may generate N×M bytes of accumulator output 214 that is provided to a multi-state multiplexer 216 driven by counter and control logic 218. The multi-state multiplexer may generate N output bytes 220 that may be formed into output data packets 222 (e.g., encoded or decoded data packets).

Figure 3:
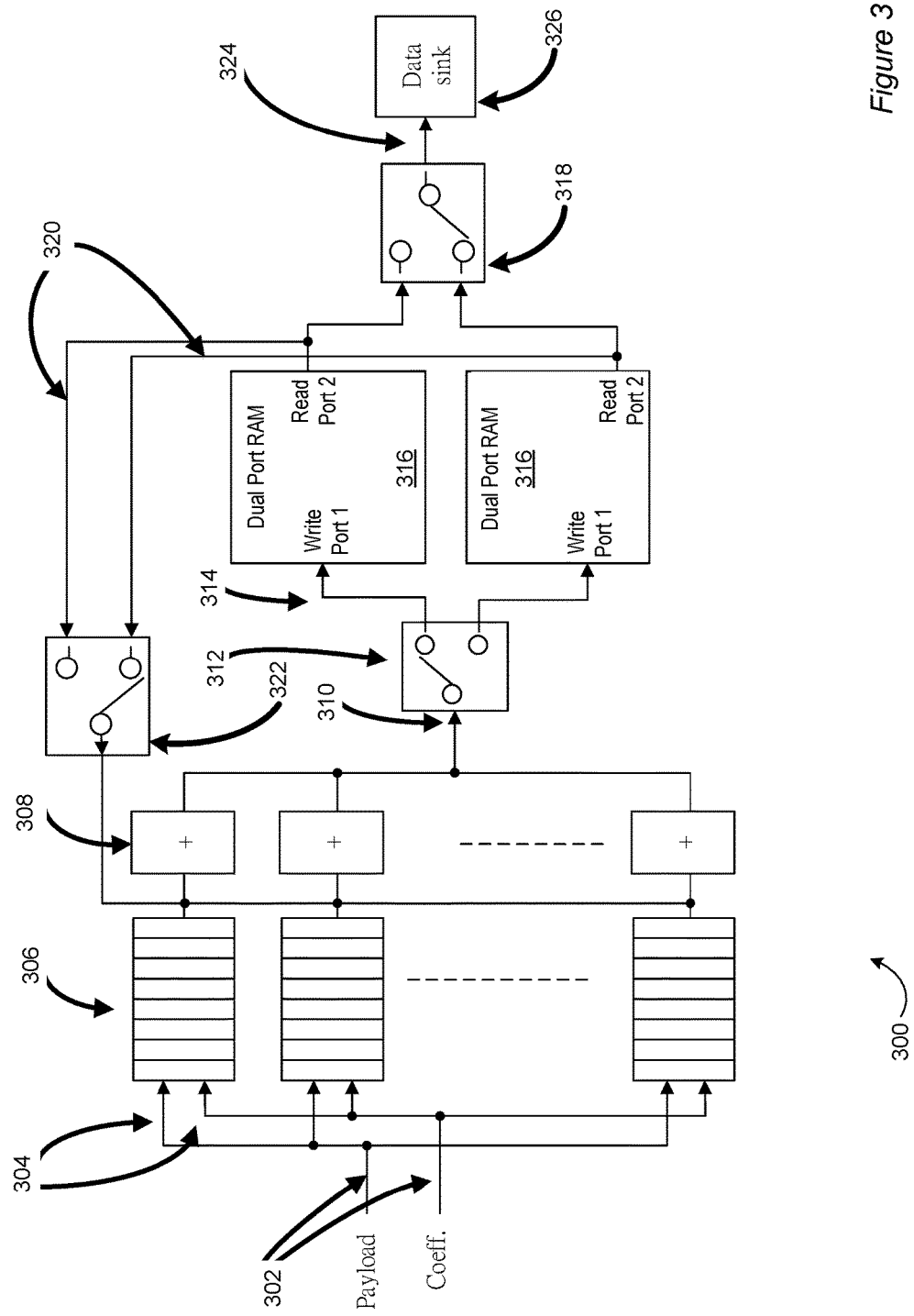
FIG. 3 is a schematic diagram depicting aspects of an example pipelined accumulator in accordance with at least one embodiment of the invention.

FIG. 3 depicts an example pipelined accumulator 300 in accordance with at least one embodiment of the invention. For example, the pipelined accumulator may be implemented with an FPGA (e.g., may be contained in the FPGA). In FIG. 3, the system data bus has a width of N bytes. The payload and coefficient data paths 302 have a width of N bytes. The pipelined multiplier inputs 304 have a width of 1 byte. There are N pipelined multipliers 306 (collectively, "pipelined multiplier component"). There are N add/pass modules 308 (collectively, "addition compoent"). The collective output 310 of the add/pass modules 308 has a width of N bytes. A data path selector 312 sends the N bytes 314 to one of two dual port RAM modules 316 (sometimes called memory components herein) that have a depth of packet size/N. The dual port RAM modules accumulate N bytes that are then provided, for example, to the multi-state multiplexer of FIG. 2. A complementary data selector 318 selects the dual port RAM module 316 having data suitable for output. The output may also be routed along a feedback path 320 of width N bytes. A third data selector 322, again complementary to the first 312, selects the dual port RAM module 316 having data suitable for feedback.

The pipelined accumulator 300 is a reconfigurable system receiving input from at least two data sources 302 (e.g., payload and coefficients as depicted in FIG. 3) and producing output 324 for one data sink 326. The pipelined accumulator has components including an accumulator, RAM, switches (e.g., data path selectors) and a feedback mechanism.

An example pipelined multi-stage wide-bandwidth accumulator (ACC) 300 is depicted in FIG. 3. ACC includes k stages of micro-operations in tandem, with k−1 stages for multiplication 306 and the $k^{th}$, last, stage for addition 308. It has a wide-bandwidth to enable processing of each packet of a same batch simultaneously, i.e., in parallel. The ACC may also produce each output packet of a batch in parallel, but the following describes the generation of only one single output packet for clarity. This parallel and multiple stage design implementation can help reduce cycle interval. ACC accepts two operands 302: i) packet data and ii) matrix coefficients suitable for use in a BATS codes (e.g., random-generated matrix coefficients). An accumulator operation includes at least two component operations: during operation 1 the ACC applies multiplication operations on the parallel input data in k−1 micro-operation stage/cycles, and during operation 2 the ACC adds the above-produced parallel data to the last result (i.e., the feedback from a first RAM module) to produce a new result (to be stored in a second RAM module after the 'add' micro-operation).

Dual port random access memory (RAM) 316 includes RAM sub-modules, and each RAM sub-module includes memory and two ports. Each port (e.g., Port 1 and Port 2) includes data bus, address bus and control signal, and allows independent and simultaneous access (read and/or write) to the entire memory of the RAM sub-module concerned. FIG. 3 shows a configuration with two RAM sub-modules 316. However, the pipelined accumulator can include any suitable number of RAM sub-modules.

Data path switch (SW), 312 of FIG. 3, is used to control the connection between ACC and RAM sub-modules. Selector 322 of FIG. 3 is a SW connecting two RAM sub-modules 316 to complete the data feedback circuit 320 for data accumulation in ACC in a pipelined manner.

Feedback path (FB) 320 of FIG. 3, connects the appropriate (subject to SW 322 control) RAM sub-modules 316 to ACC. The partial results stored in RAM will be fed back to ACC's last addition stage as an input operand to do further accumulation (addition).

The pipelined accumulator 300 may perform several operations, including:

1. Data sources produce two sets of input data 302 (e.g., BATS code packet data and matrix coefficients) for the accumulator (A), and the accumulator applies an arithmetic operation on them.

2. Before the accumulator finishes calculation on one set of the input data, it becomes ready to accept new set of data in a $2^{nd}$ micro-operation cycle, due to its pipelined design.

3. During the arithmetic operation, the last result is read from the port 2 of the dual port RAM 316 through the feedback path 320. When the first k cycles of arithmetic micro-operations are completed in accumulator 300, the results will be shifted without adding and will be stored into RAM; when further (k−1) cycles of arithmetic micro-operations are completed, the last result is ready and the accumulator can add to produce new results immediately.

4. The new results are written in one of the dual port RAM 316 through port 1. During that time, port 2 and the accumulator each can independently work on another set of data simultaneously.

5. When all data within a specified set is accumulated after N cycles (N being a supplied parameter), the data path switch 318 at the right hand side in 324 of FIG. 3 will toggle and a data sink will receive the accumulated results through port 2.

6. Before all results are read by data sink 326, nothing can be written to the RAM sub-module concerned through port 1 since newly produced results will overwrite the unread results. For this reason, the configuration includes another RAM sub-module. The data path switch at the left hand side in 312 of FIG. 3 will toggle and connect the accumulator to another RAM sub-module (say the lower RAM sub-module 316 of FIG. 3), which is ready to be overwritten, so that the system 300 can accept new data immediately and continue with the operations.

7. The above (e.g., operations 1 through 6) repeats with the toggle switch 312 alternating to connect the accumulator to the two RAM sub-modules 316. The above allows parallel processing of data of each packet of a same batch of the BATS code. The different output packets of the same batch, which use the same set of input packets of the same batch though using different sets of coefficients, are processed similarly and simultaneously, and hence data flow is done in a single pass through the system, without the extra need of data storage for immediate results (e.g., RAM may be the only necessary buffer). In accordance with at least one embodiment of the invention, unnecessary waiting is optimized (e.g., minimized) at the side of data sources during results output to the data sink side. In accordance with at least one embodiment of the invention, these techniques enable relatively high system throughput for BATS code implementation utilizing FPGAs.

8. The configuration also allows on-the-fly reconfiguration by accepting parameters from outside and/or re-generating parameters internally. The hardware can be reconfigured based on revised parameters, such as batch size M, degree distributions, set of coefficients, and any suitable BATS code parameter. Reconfiguring the hardware accordingly and reallocating its internal resources such as number of accumulators, storage size and/or number of processor cores can optimize for different networking environments and changing network conditions (e.g., latency, bandwidth, error rates).

The pipelined accumulator depicted in FIG. 3 can be operated so as to be flexible with respect to changing amounts of input and output data. For example:

Mode 1, equilibrium status at the input and feedback path. If the amount of data source and the produced data in the feedback path are equal, the data pipe from ACC to RAM module concerned will not be fully filled or entirely empty. In this case, the input side is constantly ready to accept new data and the output side is constantly ready to send out results data.

Mode 2, source has more data than the feedback path. If the amount of data source is larger, the input side is designed to be constantly ready to accept new data but the output side will only send out results data intermittently.

Mode 3, the feedback path has more data than the source. If the amount of produced data is larger, the output side is constantly sending results data over the feedback path but the input side can only accept data intermittently.

FIGS. 4a, 4b, 4c, 4d and 4e illustrate how the packets feed into the pipelined accumulator during different clock cycles and how the feedback data goes into the accumulator again.

Figure 4A:
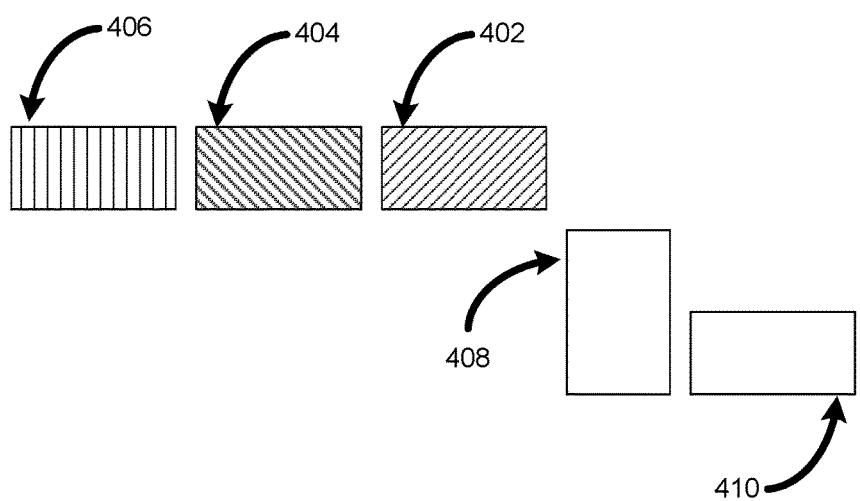
FIG. 4a is a timing diagram depicting example data processing with hardware components in accordance with at least one embodiment of the invention.

FIG. 4a illustrates clock cycle 0. Three packets (red 402, green 404, blue 406) are input to an ACC 408 with an 8 stage multiplication+1 stage of addition. A RAM 410 is of size 1024 bytes. The data packets 402, 404, 406 flow into the ACC 408, are processed as described above and then an output of the ACC 408 (e.g., output 324 of FIG. 3) is stored in the RAM 410.

Figure 4B:
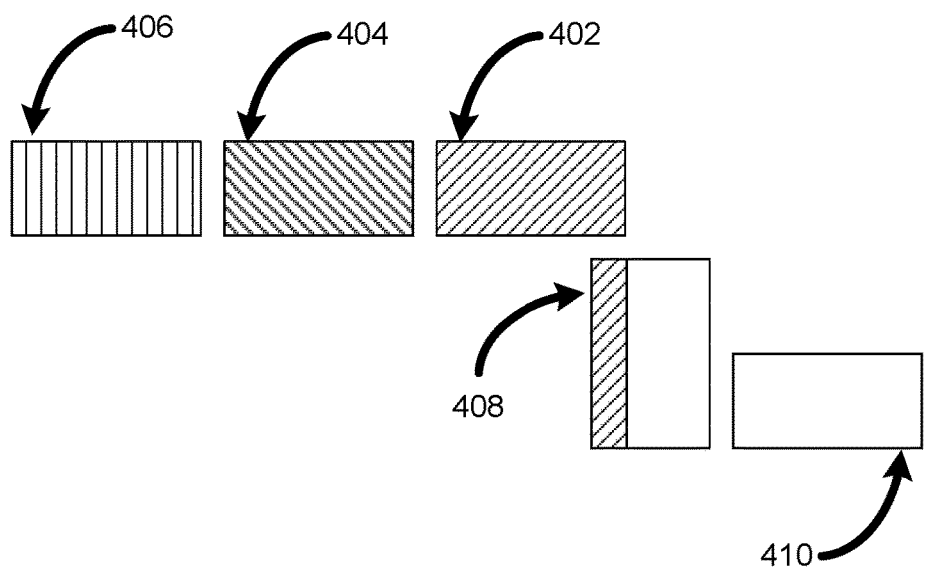
FIG. 4b is a timing diagram depicting example data processing with hardware components in accordance with at least one embodiment of the invention.

FIG. 4b illustrates clock cycle 5, in which data (from the red data packet 402) is entering the ACC 408 but not yet entering the RAM 410.

Figure 4C:
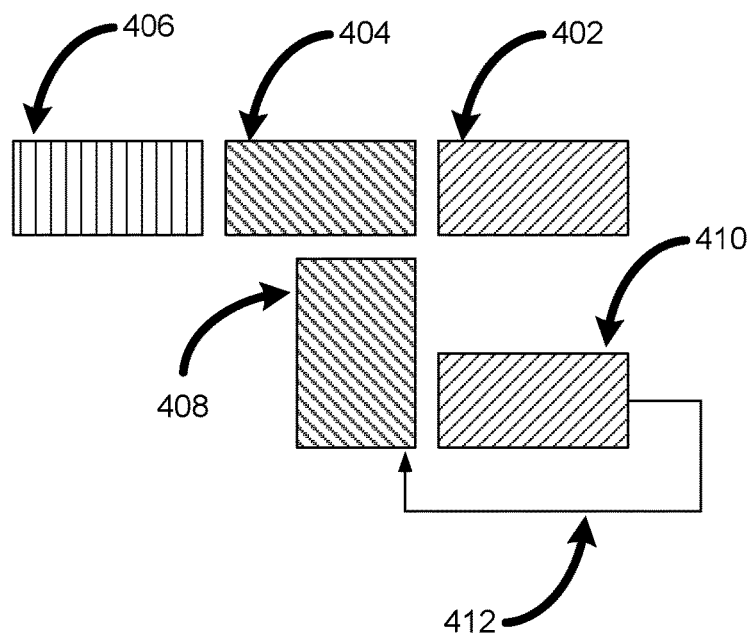
FIG. 4c is a timing diagram depicting example data processing with hardware components in accordance with at least one embodiment of the invention.

FIG. 4c illustrates clock cycle 1024+9. Processed packet "red" 402 is fed back from RAM 410. The first byte of packet "green" 404 is reaching the addition stage of the ACC 408. In this example, the data packets 402, 404, 406 have a size of 1024 bytes. Data packet 402 has been processed and has filled up RAM 410. Feedback 412 is beginning. For example, feedback may be occurring along data path 320 of FIG. 3.

Figure 4D:
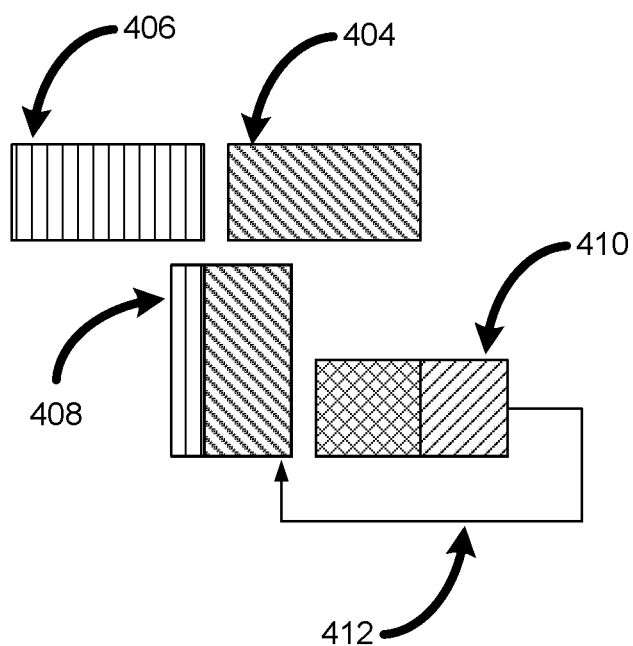
FIG. 4d is a timing diagram depicting example data processing with hardware components in accordance with at least one embodiment of the invention.

FIG. 4d illustrates clock cycle 1024+9+1020 during which packets "red" 402 and "green" 404 are being accumulated in RAM 410. RAM 410 now contains processed data from packet 402 (depicted in FIG. 4c and FIG. 4d with forward diagonal hashing), as well as processed data from both packets 402 and 404 (depicted in FIG. 4*d* with cross diagonal hashing).

Figure 4E:
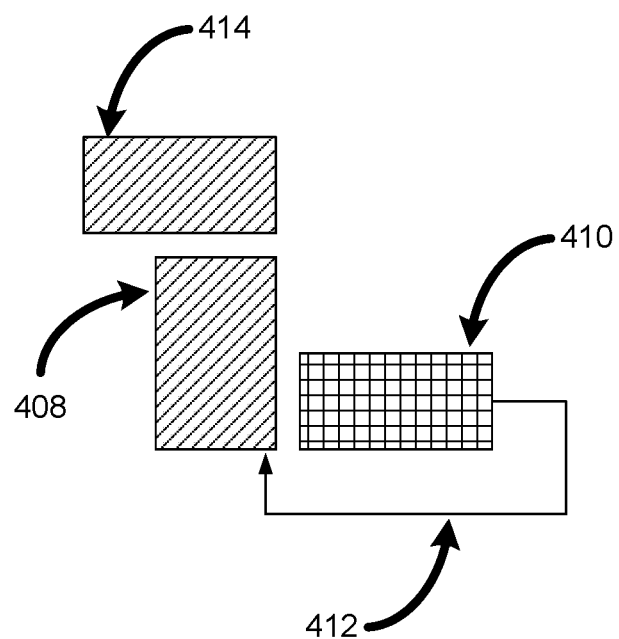
FIG. 4e is a timing diagram depicting example data processing with hardware components in accordance with at least one embodiment of the invention.

FIG. 4*e* illustrates clock cycle 1024×3+9. In this example, the batch degree is 3 so that the first three packets 402, 404, 406 have been processed and the result stored in RAM 410. Packet "red" 414 is a first packet of a new batch, now reaching the end of ACC 408.

Figure 5:
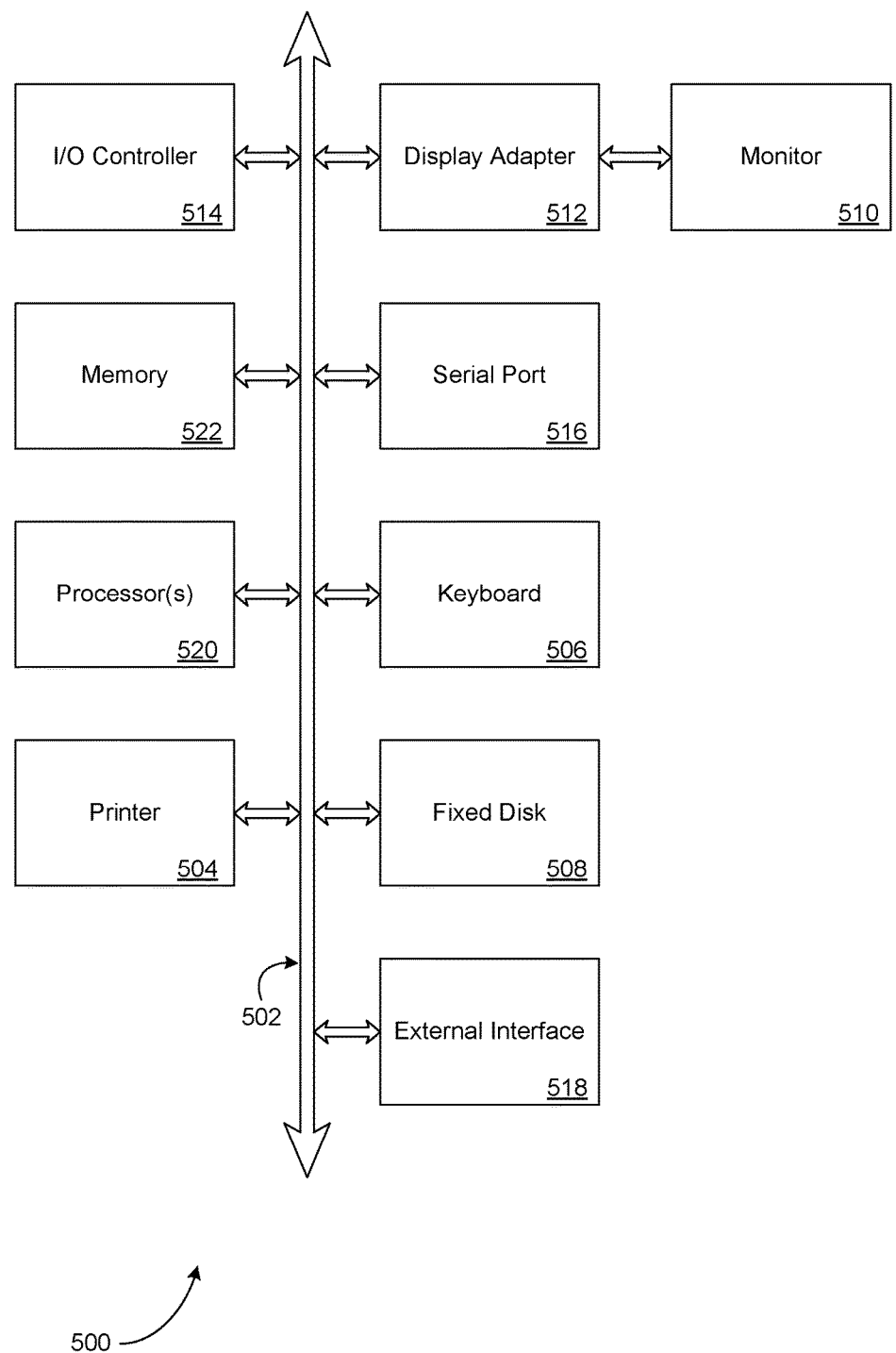
FIG. 5 is a schematic diagram depicting aspects of an example computing device in accordance with some embodiments of the present invention.

In accordance with at least some embodiments, the system, apparatus, methods, processes and/or operations for message coding may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 5 depicts aspects of elements that may be present in a computer device and/or system 500 configured to implement a method and/or process in accordance with some embodiments of the present invention. The subsystems shown in FIG. 5 are interconnected via a system bus 502. Additional subsystems such as a printer 504, a keyboard 506, a fixed disk 508, a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

Figure 6:
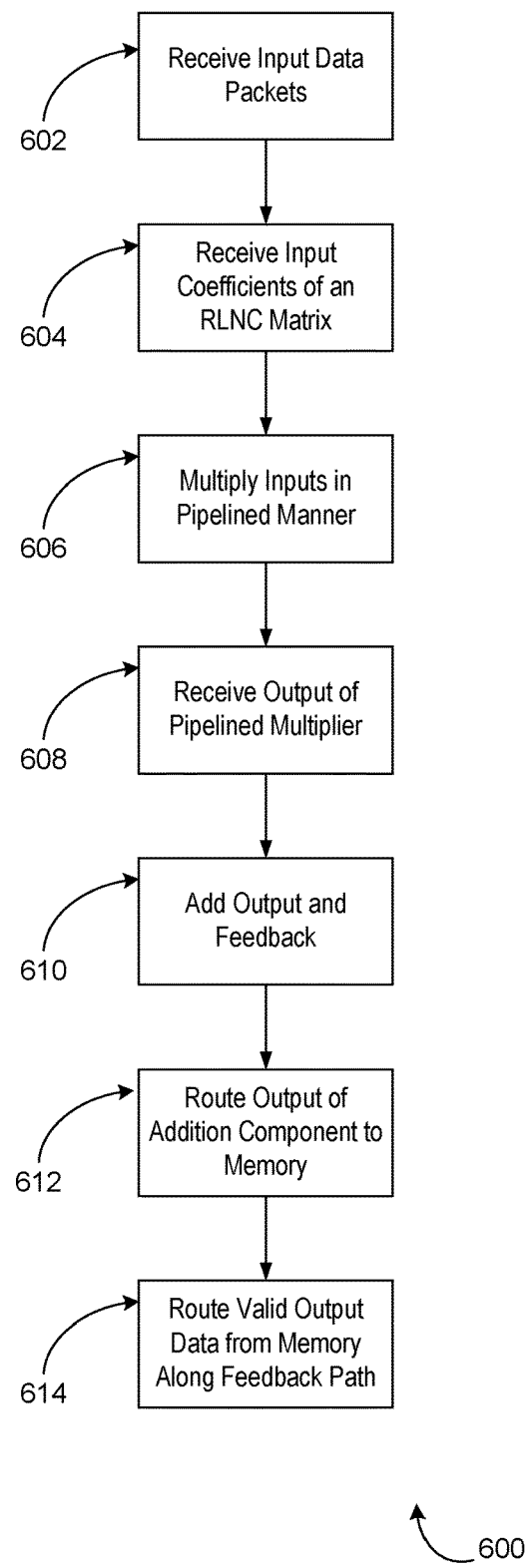
FIG. 6 is a flow diagram depicting aspects of an example procedure in accordance with at least one embodiment of the invention.

FIG. 6 depicts aspects of an example procedure 600 in accordance with at least one embodiment of the invention. At 602, input data packets may be received. For example, the pipelined multipliers 306 (FIG. 3) may receive input data packets on the payload input line 302. At 604, coefficients of a matrix associated with a random linear network code (e.g., a BATS code) may be received. For example, the pipelined multipliers 306 may receive the coefficients on the coefficient input line 302. At 606, the inputs may be multiplied in a pipelined manner. For example, the input data packets received at 602 and the coefficients received at 604 may be multiplied together with the pipelined multipliers 306.

At 608, output of the pipelined multipliers may be received, for example, by the add/pass modules 308 (FIG. 3). At 610, the output of the pipelined multipliers may be added to feedback data. For example, the add/pass modules 308 may add the output of the add/pass modules 308 to the output of the third data selector 322 that is selecting data from the feedback path 320. At 612, an output of an addition component may be routed to memory. For example, the output 310 of the add/pass modules 308 may be routed to a dual port RAM 316 by the data path selector 312. It may take a number of clock cycles before an output of the dual port RAM 316 is valid feedback and valid output to the data sink 326. Once the output of the memory is valid, the valid output data may be routed along the feedback path 320 at 614.

It should be understood that the present invention as described above can be implemented in the form of control logic using computer software in a modular or integrated manner. Alternatively, or in addition, embodiments of the invention may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. In particular, the encoder and/or decoder describe above with reference to FIG. 1 may be partially or entirely implemented in hardware. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present invention using hardware and/or a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Example embodiments in accordance with the invention are described below.

Example 1 is an apparatus for device-facilitated communication, the apparatus including: a pipelined multiplier component configured at least to multiply bytes of input data packets with coefficients of a matrix associated with a random linear network code in a pipelined manner; an addition component communicatively coupled with the pipelined multiplier component and configured at least to add an output of the pipelined multiplier component to a byte of feedback data; a first switch communicatively coupled with the addition component and a plurality of memory components, the first switch configured at least to switch from a memory component of the plurality of memory components when the memory component contains valid output data based at least in part on output of the addition component; and a second switch communicatively coupled with the addition component and the plurality of memory components, the second switch configured at least to switch to the memory component of the plurality of memory components when the memory component contains valid output data thereby providing the valid output data to the addition component as feedback data.

Example 2 is an apparatus in accordance with example 1, further including a batched sparse (BATS) code encoder or decoder implemented at least in part with the pipelined multiplier component, the addition component, the first switch and the second switch. Example 3 is an apparatus in accordance with example 2, wherein the coefficients are coefficients of a transfer matrix of the BATS code. Example 4 is an apparatus in accordance with example 2, wherein the BATS code utilizes batches of M data packets, and the BATS code encoder or decoder comprises M pipelined accumulator components, each pipelined accumulator component including a copy of the pipelined multiplier component, the addition component, the first switch and the second switch.

Example 5 is an apparatus in accordance with example 4, wherein the BATS code encoder or decoder is configured at least to dynamically adjust the number M of data packets in a batch and the corresponding number M of pipelined accumulator components to adapt to changing network conditions. Example 6 is an apparatus in accordance with example 4, further including a multi-state multiplexer communicatively coupled with an output of each of the M pipelined accumulator components. Example 7 is an apparatus in accordance with example 2, wherein the pipelined multiplier component, the addition component, the first switch and the second switch collectively implement at least in part one of: finite field arithmetic, a Gaussian elimination operation, and a belief propagation calculation.

Example 8 is an apparatus in accordance with example 1, further including a plurality of pipelined multiplier components and a plurality of addition components in a one-to-one correspondence. Example 9 is an apparatus in accordance with example 8, wherein the input data packets comprise N bytes, the valid output data comprises N bytes, the feedback data comprises N bytes, the plurality of pipelined multiplier components comprises N pipelined multiplier components, and the plurality of addition components comprises N addition components. Example 10 is an apparatus in accordance with example 9, wherein the apparatus is configured at least to dynamically adjust the number N of bytes in input data packets and the corresponding number N of pipelined multiplier components to adapt to changing network conditions.

Example 11 is an apparatus in accordance with example 1, wherein the pipelined multiplier component, the addition component, the first switch and the second switch are implemented at least in part with one or more field-programmable gate arrays. Example 12 is an apparatus in accordance with example 1, wherein the memory component comprises a dual port random access memory (RAM) component. Example 13 is an apparatus in accordance with example 1, wherein the pipelined multiplier component, the addition component, the first switch and the second switch operate based at least in part on a clock signal such that increasing a frequency of the clock signal increases a data throughput rate. Example 14 is an apparatus in accordance with example 1, wherein the coefficients are based at least in part on an output of a hardware-implemented random number generator. Example 15 is an apparatus in accordance with example 1, wherein the apparatus is configured at least to dynamically adjust a storage capacity of the plurality of memory components to adapt to changing network conditions.

Example 16 is a method for device-facilitated communication, the method including: receiving, with a pipelined multiplier component, input data packets and coefficients of a matrix associated with a random linear network code; multiplying, with the pipelined multiplier component, bytes of the input data packets with corresponding coefficients in a pipelined manner; receiving, with an addition component, an output of the pipelined multiplier component and feedback data; adding, with the addition component, the output of the pipelined multiplier component to a byte of the feedback data; routing, with a first switch, output of the addition component to a first memory until the first memory stores valid output data based at least in part on the output of the addition component; and routing, with a second switch, valid output data from the first memory along a feedback data path to the addition component such that the valid output data serves as feedback data utilized to generate new valid output data in a second memory.

Example 17 is a method in accordance with example 16, wherein the input data packets represent a plurality of streams of digital media. Example 18 is a method in accordance with example 16, wherein the pipelined multiplier component, the addition component, the first switch and the second switch are incorporated in a wireless communication device. Example 19 is a method in accordance with example 16, wherein the method encodes or decodes the input data packets to facilitate communication of audio, video or multimedia data.

Example 20 is one or more computer-readable media collectively having thereon computer-executable instructions that configure one or more devices to collectively, at least: cause receipt, with a pipelined multiplier component, of input data packets and coefficients of a matrix associated with a random linear network code; cause multiplication, with the pipelined multiplier component, of bytes of the input data packets with corresponding coefficients in a pipelined manner; cause receipt, with an addition component, of an output of the pipelined multiplier component and feedback data; cause addition, with the addition component, of the output of the pipelined multiplier component to a byte of the feedback data; cause routing, with a first switch, of output of the addition component to a first memory until the first memory stores valid output data based at least in part on the output of the addition component; and cause routing, with a second switch, of valid output data from the first memory along a feedback path to the addition component such that the valid output data serves as feedback data utilized to generate new valid output data in a second memory.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. An apparatus for device-facilitated communication, the apparatus comprising:
   a pipelined multiplier component configured at least to multiply bytes of input data packets with coefficients of a matrix associated with a random linear network code in a pipelined manner;
   an addition component communicatively coupled with the pipelined multiplier component and configured at least to add an output of the pipelined multiplier component to a byte of feedback data;
   a first switch communicatively coupled with the addition component and a plurality of memory components, the first switch configured at least to switch from a memory component of the plurality of memory components when the memory component contains valid output data based at least in part on output of the addition component; and
   a second switch communicatively coupled with the addition component and the plurality of memory components, the second switch configured at least to switch to the memory component of the plurality of memory components when the memory component contains valid output data thereby providing the valid output data to the addition component as feedback data.

2. An apparatus in accordance with claim 1, further comprising a batched sparse (BATS) code encoder or decoder implemented at least in part with the pipelined multiplier component, the addition component, the first switch and the second switch.

3. An apparatus in accordance with claim 2, wherein the coefficients are coefficients of a transfer matrix of the BATS code.

4. An apparatus in accordance with claim 2, wherein the BATS code utilizes batches of M data packets, and the BATS code encoder or decoder comprises M pipelined accumulator components, each pipelined accumulator component comprising a copy of the pipelined multiplier component, the addition component, the first switch and the second switch.

5. An apparatus in accordance with claim 4, wherein the BATS code encoder or decoder is configured at least to dynamically adjust the number M of data packets in a batch and the corresponding number M of pipelined accumulator components to adapt to changing network conditions.

6. An apparatus in accordance with claim 4, further comprising a multi-state multiplexer communicatively coupled with an output of each of the M pipelined accumulator components.

7. An apparatus in accordance with claim 2, wherein the pipelined multiplier component, the addition component, the first switch and the second switch collectively implement at least in part one of: finite field arithmetic, a Gaussian elimination operation, and a belief propagation calculation.

8. An apparatus in accordance with claim 1, further comprising a plurality of pipelined multiplier components and a plurality of addition components in a one-to-one correspondence.

9. An apparatus in accordance with claim 8, wherein the input data packets comprise N bytes, the valid output data comprises N bytes, the feedback data comprises N bytes, the plurality of pipelined multiplier components comprises N pipelined multiplier components, and the plurality of addition components comprises N addition components.

10. An apparatus in accordance with claim 9, wherein the apparatus is configured at least to dynamically adjust the number N of bytes in input data packets and the corresponding number N of pipelined multiplier components to adapt to changing network conditions.

11. An apparatus in accordance with claim 1, wherein the pipelined multiplier component, the addition component, the first switch and the second switch are implemented at least in part with one or more field-programmable gate arrays.

12. An apparatus in accordance with claim 1, wherein the memory component comprises a dual port random access memory (RAM) component.

13. An apparatus in accordance with claim 1, wherein the pipelined multiplier component, the addition component, the first switch and the second switch operate based at least in part on a clock signal such that increasing a frequency of the clock signal increases a data throughput rate.

14. An apparatus in accordance with claim 1, wherein the coefficients are based at least in part on an output of a hardware-implemented random number generator.

15. An apparatus in accordance with claim 1, wherein the apparatus is configured at least to dynamically adjust a storage capacity of the plurality of memory components to adapt to changing network conditions.

16. A method for device-facilitated communication, the method comprising:
   receiving, with a pipelined multiplier component, input data packets and coefficients of a matrix associated with a random linear network code;
   multiplying, with the pipelined multiplier component, bytes of the input data packets with corresponding coefficients in a pipelined manner;
   receiving, with an addition component, an output of the pipelined multiplier component and feedback data;
   adding, with the addition component, the output of the pipelined multiplier component to a byte of the feedback data;
   routing, with a first switch, output of the addition component to a first memory until the first memory stores valid output data based at least in part on the output of the addition component; and
   routing, with a second switch, valid output data from the first memory along a feedback data path to the addition component such that the valid output data serves as feedback data utilized to generate new valid output data in a second memory.

17. A method in accordance with claim 16, wherein the input data packets represent a plurality of streams of digital media.

18. A method in accordance with claim 16, wherein the pipelined multiplier component, the addition component, the first switch and the second switch are incorporated in a wireless communication device.

19. A method in accordance with claim 16, wherein the method encodes or decodes the input data packets to facilitate communication of audio, video or multimedia data.

20. One or more non-transitory computer-readable media collectively having thereon computer-executable instructions that configure one or more devices to collectively, at least:
   cause receipt, with a pipelined multiplier component, of input data packets and coefficients of a matrix associated with a random linear network code;

cause multiplication, with the pipelined multiplier component, of bytes of the input data packets with corresponding coefficients in a pipelined manner;

cause receipt, with an addition component, of an output of the pipelined multiplier component and feedback data;

cause addition, with the addition component, of the output of the pipelined multiplier component to a byte of the feedback data;

cause routing, with a first switch, of output of the addition component to a first memory until the first memory stores valid output data based at least in part on the output of the addition component; and cause routing, with a second switch, of valid output data from the first memory along a feedback path to the addition component such that the valid output data serves as feedback data utilized to generate new valid output data in a second memory.

* * * * *